(12) United States Patent
Noro et al.

(10) Patent No.: US 10,334,137 B2
(45) Date of Patent: Jun. 25, 2019

(54) IMAGE READING APPARATUS AND IMAGE READING METHOD

(71) Applicant: CANON KABUSHIKI KAISHA, Tokyo (JP)

(72) Inventors: Toshitaka Noro, Kashiwa (JP); Hirotaka Seki, Tokyo (JP); Katsuhiro Ishido, Abiko (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/334,078

(22) Filed: Oct. 25, 2016

(65) Prior Publication Data

US 2017/0126929 A1 May 4, 2017

(30) Foreign Application Priority Data

Nov. 4, 2015 (JP) .................................. 2015-216643

(51) Int. Cl.
*G06F 15/00* (2006.01)
*H04N 1/387* (2006.01)
*H04N 1/00* (2006.01)
*H04N 1/409* (2006.01)

(52) U.S. Cl.
CPC ....... *H04N 1/3878* (2013.01); *H04N 1/00718* (2013.01); *H04N 1/00748* (2013.01); *H04N 1/00809* (2013.01); *H04N 1/4092* (2013.01); *H04N 2201/0094* (2013.01)

(58) Field of Classification Search
CPC ............. H04N 1/3878; H04N 1/00718; H04N 1/00748; H04N 1/00809
USPC ....................................................... 358/1.18
See application file for complete search history.

(56) References Cited

U.S. PATENT DOCUMENTS

| 8,018,629 | B2 | 9/2011 | Watanabe | 358/474 |
| 8,174,737 | B2 | 5/2012 | Kato et al. | 358/474 |
| 8,284,463 | B2 | 10/2012 | Kato et al. | 358/488 |
| 8,477,390 | B2 | 7/2013 | Iwayama | 358/488 |
| 9,363,399 | B2 * | 6/2016 | Mabara | H04N 1/00745 |
| 2007/0285690 | A1 * | 12/2007 | Matsuda | H04N 1/401 |
| | | | | 358/1.9 |

(Continued)

FOREIGN PATENT DOCUMENTS

| JP | 2013-115617 | 6/2013 |
| JP | 2013-123119 | 6/2013 |

OTHER PUBLICATIONS

U.S. Appl. No. 15/334,086, filed Oct. 25, 2016.
U.S. Appl. No. 15/334,089, filed Oct. 25, 2016.

*Primary Examiner* — Mark R Milia
(74) *Attorney, Agent, or Firm* — Venable LLP

(57) ABSTRACT

Provided is an image reading apparatus configured to recognize edge portions of an image of an original precisely without being influenced by the varying state of the four sides of the original. The image reading apparatus includes an image reading unit configured to read the original image by scanning the original, an edge determining unit configured to determine first edge locations at the left end and right end of the original image in a main scanning direction, an edge detector configured to detect a second edge location of the original image in a sub-scanning direction, a tilt expression calculator configured to calculate a linear expression that represents the amount of inclination of the original image with respect to the main scanning direction.

9 Claims, 13 Drawing Sheets

(56) References Cited

U.S. PATENT DOCUMENTS

| | | | |
|---|---|---|---|
| 2008/0030811 A1* | 2/2008 | Nishitani | B65H 9/002 358/498 |
| 2009/0185240 A1 | 7/2009 | Kato et al. | 358/474 |
| 2011/0085186 A1* | 4/2011 | Yi | H04N 1/00005 358/1.9 |
| 2012/0061909 A1* | 3/2012 | Shikama | B65H 7/08 271/227 |
| 2013/0182002 A1* | 7/2013 | Macciola | H04N 1/387 345/589 |
| 2014/0044467 A1* | 2/2014 | Murayama | G03G 15/6567 399/395 |

* cited by examiner

FIG. 13

IMAGE READING APPARATUS AND IMAGE READING METHOD

BACKGROUND OF THE INVENTION

Field of the Invention

The present invention relates to an image reading apparatus, e.g., a scanner, which is configured to read an image (hereinafter referred to as "original image") of an original.

Description of the Related Art

An image reading apparatus is provided to an image forming apparatus, e.g., a copier or a multifunction apparatus, and is used to read an original image in copying or facsimile transmission. Moreover, the image reading apparatus may be connected to an information processing apparatus, e.g., a personal computer, and be used as a scanner. The image reading apparatus may include an original conveying apparatus, e.g., an automatic document feeder (ADF). The image reading apparatus including the original conveying apparatus is configured to continuously take in originals from the original conveying apparatus one by one, and to continuously read original images while conveying the taken-in originals. The image reading apparatus can efficiently read the original images by continuously taking in the originals from the original conveying apparatus.

To read an original image, the image reading apparatus irradiates an original being conveyed with light, and receives reflected light from the original. The image reading apparatus converts the received reflected light into an electric signal to generate image data representing the read original image. The image reading apparatus reads the original image assuming that a direction perpendicular to a conveying direction of the original is a main scanning direction. When the original is conveyed with inclination with respect to the main scanning direction, the image reading apparatus reads the original image in an inclined state. In order to correct the inclination of the original image, there is proposed an image reading apparatus configured to detect the inclination of an original being conveyed to correct the inclination. In U.S. Pat. No. 8,477,390, there is proposed an image processing apparatus configured to correct the inclination by recognizing an edge portion of an original image with precision.

There is a case where specks, smudges, and the like are adhered to the background portion of an image reading apparatus which is outside the area of an original at a point where an original image is read. In this case, the image reading apparatus erroneously reads the specks, smudges, and the like in the background portion as an image (hereinafter referred to as "speck image"). The image reading apparatus conducting original image edge portion detection from a read image that contains a speck image may mistake the speck image for an edge portion of the original image. Misidentification of the original image edge portion hinders the accurate detection of the inclination amount of the original image. In U.S. Pat. No. 8,018,629, there is proposed an image reading apparatus configured to correct the tilt of an original by accurately detecting the location of a border between an image of the original and the background (an edge portion), the tilt of the original image, and the size of the original image despite specks that are adhered to an image sensor or to a member opposite the image sensor.

When the four sides of an original are in approximately the same state (in terms of the degree of deterioration), the image processing apparatus of U.S. Pat. No. 8,477,390 recognizes the edges of the original with precision. However, the four sides of an original are not always in the same state, and even the image processing apparatus of U.S. Pat. No. 8,477,390 may fail to make a precise inclination correction and position correction to an original that is torn, warped, or bent too much for the image processing apparatus to recognize the edges of the original with precision. This is true for the image reading apparatus of U.S. Pat. No. 8,018,629 in which edge detection does not take the state of the four sides of an original into consideration, and a precise inclination correction and position correction cannot be made to an original that is too torn, warped, or bent.

It is therefore a main object of this invention to provide an image reading apparatus configured to correct the inclination and position of an image of an original by recognizing edge portions of the original image precisely without being influenced by the varying state of the four sides of the original.

SUMMARY OF THE INVENTION

An image reading apparatus according to the present disclosure includes: an image reading unit configured to read an image of an original by scanning the original; an edge determining unit configured to determine first edge locations at a left end and right end of the original image in a main scanning direction, based on edge portions of the original image that are detected along a plurality of lines in the main scanning direction of an image read by the image reading unit; an edge detector configured to detect a second edge location of the original image in a sub-scanning direction; a tilt expression calculator configured to calculate a linear expression that represents an amount of inclination of the original image with respect to the main scanning direction, based on the second edge location within a given range that comprises a midpoint between the first edge location at the left end and the first edge location at the right end; a reference point calculator configured to calculate a reference point that serves as a reference for inclination correction, by using the first edge locations and the linear expression; and an inclination corrector configured to correct the inclination of the original image based on the reference point and on the inclination amount.

Further features of the present invention will become apparent from the following description of exemplary embodiments (with reference to the attached drawings).

BRIEF DESCRIPTION OF THE DRAWINGS

FIG. 13 is a diagram for illustrating the association between a state in which an original is conveyed and an image of the read original.

DESCRIPTION OF THE EMBODIMENTS

Figure 1:
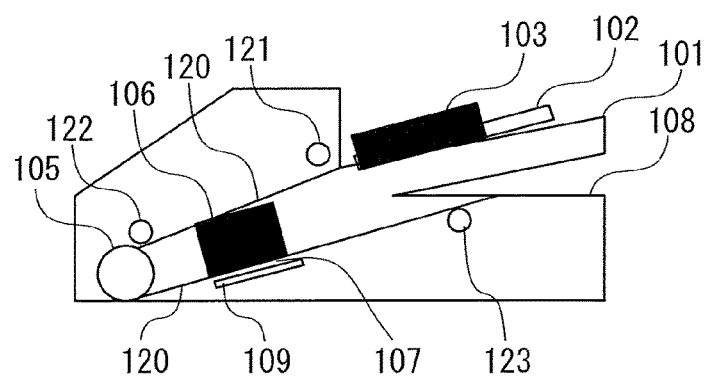
FIG. 1 is a block diagram of an image reading apparatus.

Now, embodiments of the present invention are described in detail with reference to the accompanying drawings.
First Embodiment FIG. 1 is a block diagram of an image reading apparatus provided with an original conveying mechanism. The image reading apparatus includes an original tray 101, an original conveying motor 105, an image reading unit 106, and a delivery tray 108. On the original tray 101, one or more rectangular originals 102 are placed. A sheet feeding roller 121, a conveying roller 122, and a delivery roller 123 are provided along a conveyance route 120 of the original 102. The sheet feeding roller 121, the conveying roller 122, and the delivery roller 123 are driven by the original conveying motor 105.

The original tray 101 is provided with two original guides 103 arranged side by side in a direction perpendicular to a conveying direction of the original 102. In this specification, the direction perpendicular to the conveying direction of the original 102 is referred to as "width direction of the original 102". The two original guides 103 are slidable in the width direction of the original 102, and are configured to sandwich the original 102 placed on the original tray 101 for registration. The sheet feeding roller 121 is configured to take in the originals 102 placed on the original tray 101 one by one. The conveying roller 122 is configured to convey the original 102 taken in by the sheet feeding roller 121 to the image reading unit 106. An original background plate 109 is provided in a position opposed to the image reading unit 106 across the conveyance route 120. The image reading unit 106 forms an image reading position 107 between the image reading unit 106 and the original background plate 109. The image reading unit 106 is configured to read an original image when the original 102 conveyed by the conveying roller 122 passes through the image reading position 107. The original 102 having the original image read is delivered from the image reading position 107 onto the delivery tray 108 by the delivery roller 123.

Figure 2:
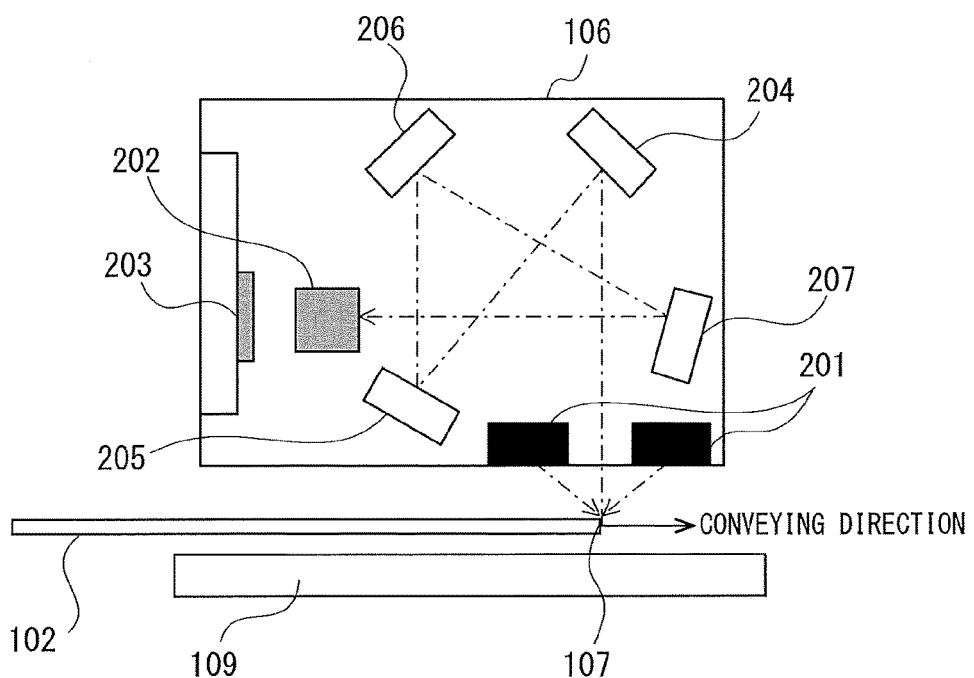
FIG. 2 is a block diagram of an image reading unit.

FIG. 2 is a block diagram of the image reading unit 106. The image reading unit 106 includes a light emitting diode (LED) light source 201, a lens 202, a charge coupled device (CCD) line sensor 203, and mirrors 204 to 207.

The LED light source 201 is configured to apply light to the original 102 passing through the image reading position 107. The LED light source 201 may be built from a plurality of LED elements (light-emitting elements) arranged side by side along the width direction of the original 102. Alternatively, the LED light source 201 may be configured to be movable in the width direction. The main scanning direction of the image reading unit 106 therefore corresponds to the width direction of the original 102. A sub-scanning direction corresponds to the conveying direction of the original 102.

The light applied to the original 102 by the LED light source 201 is reflected by the original 102. The light reflected by the original 102 is reflected by the mirrors 204 to 207, and is guided to the lens 202. The lens 202 is configured to condense the reflected light on a light-receiving surface of the CCD line sensor 203. The CCD line sensor 203 has a light-receiving surface having a line shape and extending in the main scanning direction. The CCD line sensor 203 is configured to photoelectrically convert the reflected light condensed on the light-receiving surface to generate and output analog image data being an electric signal representing the original image.

Figure 3:
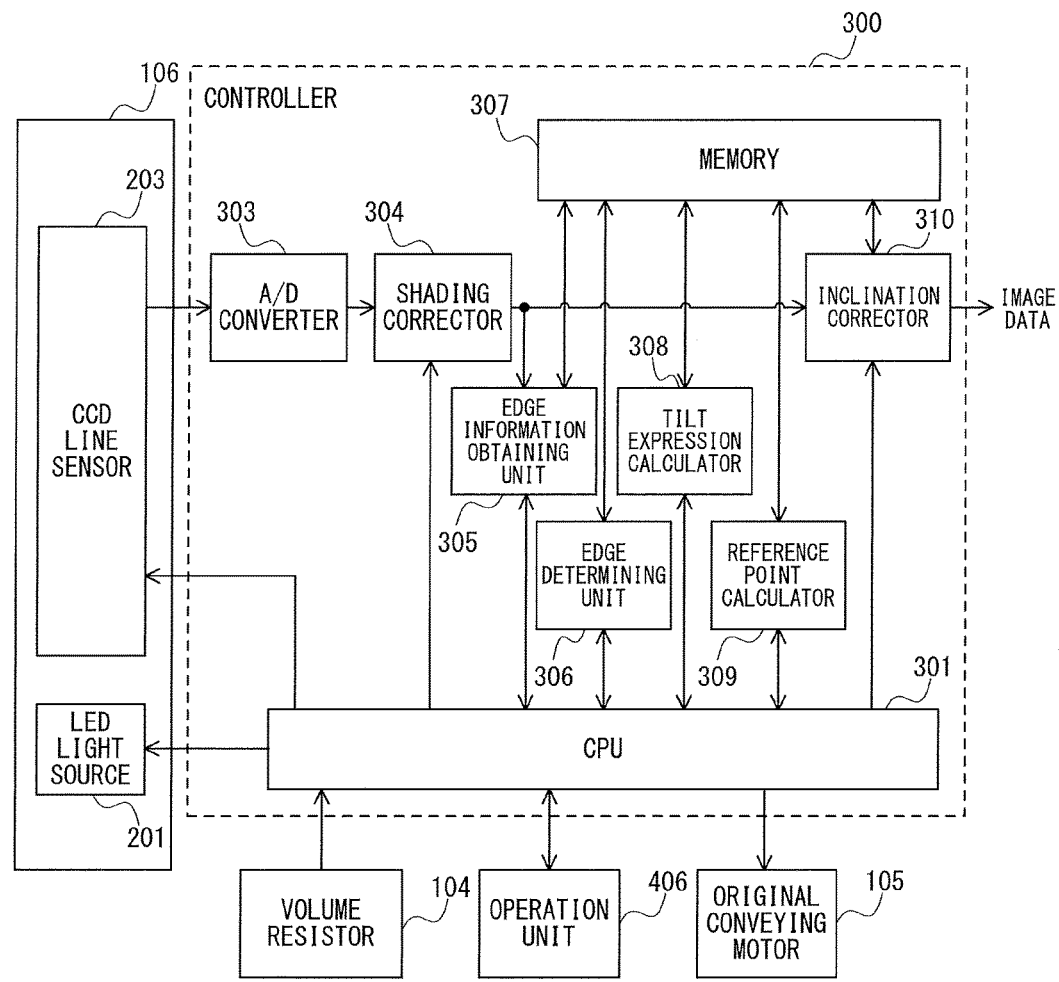
FIG. 3 is a block diagram of a controller.

FIG. 3 is a block diagram of a controller configured to control an operation of the image reading apparatus. A controller 300 is built into the image reading apparatus. The controller 300 is configured to control, by a central processing unit (CPU) 301, processing of reading the original image by the image reading apparatus. Further, in order to make an inclination correction to an original image, the controller 300 includes an A/D converter 303, a shading corrector 304, an edge information obtaining unit 305, an edge determining unit 306, a memory 307, a tilt expression calculator 308, a reference point calculator 309, and an inclination corrector 310. The controller 300 is connected to the original conveying motor 105 and the image reading unit 106 (the LED light source 201 and the CCD line sensor 203) to exert control under which the original 102 is conveyed by the original conveying motor 105, and control under which the image reading unit 106 reads an image. The controller 300 acquires the analog image data representing the original image from the CCD line sensor 203, performs image processing, for example, an inclination correction, and generates image data. The generated image data is used for copying, facsimile transmission, or transmission to a personal computer or the like.

The controller 300 is connected to a volume resistor 104, and is configured to detect the resistance value of the volume resistor 104. The volume resistor 104 varies in resistance value depending on the gap between two original guides 103. The controller 300 can detect the gap between the two original guides 103 from the resistance value of the volume resistor 104. From the gap between the two guides 103, the controller 300 detects an original width that is the size in the width direction of the original 102 placed on the original tray 101.

The controller 300 is connected to an operation unit 406. The operation unit 406 includes an input device, and is configured to receive an instruction to start image reading processing, an instruction to specify an original size, or other instructions, which is issued by a user, and to transmit the instruction to the controller 300. Further, the operation unit 406 includes an output device, e.g., a display, and is configured to display a message or the like under control of the controller 300.

The CPU 301 is configured to perform the image reading processing by controlling operations of the respective components of the image reading apparatus. In the image reading processing, the CPU 301 performs light emission control of the LED light source 201, the conveyance control of the original 102 by the original conveying motor 105, photoelectric conversion of the received reflected light by the CCD line sensor 203, and other control. The CPU 301 performs the image reading processing based on the user's instruction input through the operation unit 406. The CPU 301 is also configured to detect the original width of the original 102 placed on the original tray 101 based on the resistance value of the volume resistor 104.

The A/D converter 303 is configured to convert the analog image data input from the CCD line sensor 203 into digital image data. The shading corrector 304 is configured to perform image processing on the digital image data to correct nonuniformity of a light amount of the LED light source 201 and an influence of a pixel sensitivity of the CCD line sensor 203 (shading correction).

The edge information obtaining unit 305 is configured to remove random noise that is caused by fluctuations in the reading of the image reading unit 106, based on digital image data that has been corrected by the shading corrector 304. The edge information obtaining unit 305 is also configured to detect the amount of inclination (tilt) of an original image with respect to the main scanning direction (width direction) based on the digital image data corrected by the shading corrector 304. The edge information obtaining unit 305 inputs the detected inclination amount to the CPU 301. The edge information obtaining unit 305 is also configured to detect edge information, which indicates edge portions of the original image, based on the digital image data corrected by the shading corrector 304, and to store the edge information in the memory 307. The edge information obtaining unit 305 may obtain the digital image data from the memory 307 other than obtaining directly from the shading corrector 304. Details of the edge information obtaining unit 305 are described later.

The edge determining unit 306 is configured to detect two edge portions of an original image in the main scanning direction (width direction), and input the two edge portions to the CPU 301 as a left main scanning edge location and a right main scanning edge location. The edge determining unit 306 is configured to determine an edge portion of an original image by obtaining the edge information, which is generated in the edge information obtaining unit 305, from the memory 307, based on an original edge determination value, which is a threshold for determining an edge portion of an original image and which is specified by the CPU 301.

The tilt expression calculator 308 is configured to determine a range for which a linear expression representing the tilt of an original image is to be calculated, based on the left main scanning edge location and the right main scanning edge location that have been determined by the edge determining unit 306. The tilt expression calculator 308 is configured to calculate the linear expression, which indicates the inclination amount, the direction of the tilt, an intercept, and the direction of the intercept, by obtaining the range of data for which the linear expression is to be calculated, from the edge information obtained from the memory 307. The tilt expression calculator 308 inputs the calculated linear expression to the CPU 301.

The reference point calculator 309 is configured to input to the CPU 301 the location of one of two corner portions (a corner point) of an original image of the original 102 on the forward side of the original conveying direction as a reference point that is used to correct the inclination of the original image. The reference point calculator 309 is configured to calculate an accurate corner point of the original 102 irrespective of the varying deterioration state of the four sides of the original 102 and the inclination amount of the original 102. For that purpose, the reference point calculator 309 makes a fine adjustment to one of the two corner points of the original 102 on the forward original conveying direction side in the main scanning direction in relation to the left main scanning edge location or the right main scanning edge location, based on the edge information and the linear expression. The reference point calculator 309 deduces a corner point of the original 102 in the forward original conveying direction that serves as a reference point for inclination correction from the linear expression calculated by the tilt expression calculator 308 and from the finely adjusted corner point.

The inclination corrector 310 is configured to generate image data by making an inclination correction and a position correction to digital image data based on the inclination amount, the tilt direction, and the reference point for inclination correction. The inclination corrector 310 outputs the generated image data. The inclination corrector 310 is also configured to store the digital image data to which a shading correction has been made in the memory 307.

Details of the edge information obtaining unit 305, the edge determining unit 306, the tilt expression calculator 308, the reference point calculator 309, and the inclination corrector 310 are described below.

(Edge Information Obtaining Unit)

Figure 4:
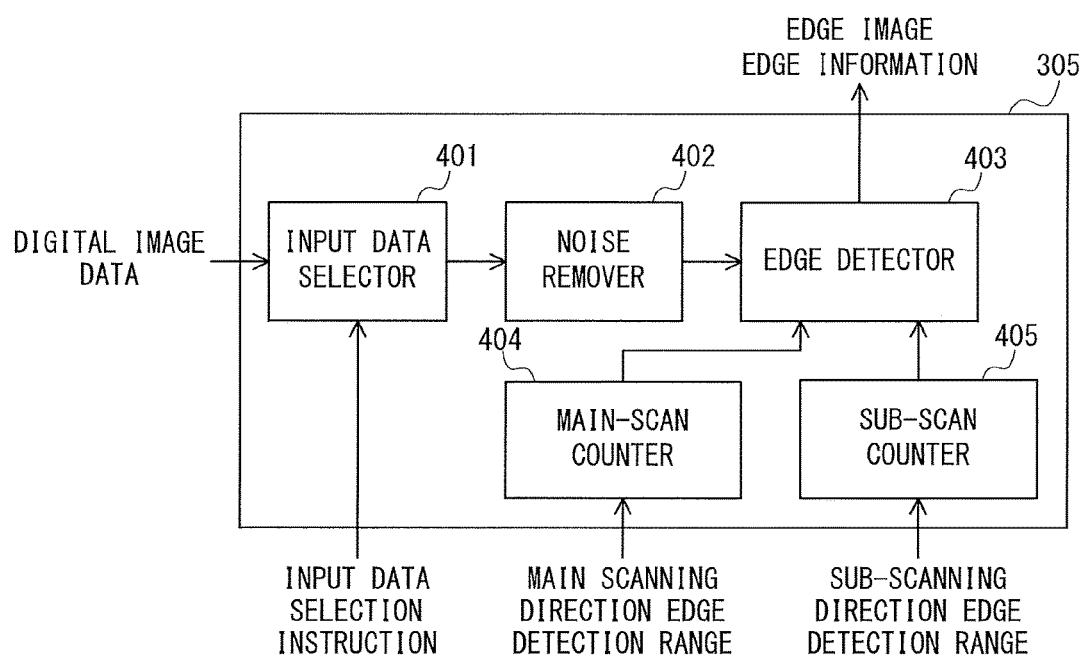
FIG. 4 is a block diagram for illustrating the detailed configuration of an edge information obtaining unit.

FIG. 4 is a block diagram for illustrating the detailed configuration of the edge information obtaining unit 305. The edge information obtaining unit 305 includes an input data selector 401, a noise remover 402, an edge detector 403, a main-scan counter 404, and a sub-scan counter 405.

The input data selector 401 is configured to transmit, to the noise remover 402, digital image data that is obtained from at least one of the shading corrector 304 and the memory 307, based on an input data selection instruction from the CPU 301. The noise remover 402 is configured to perform processing of removing a random noise component that is caused by the image reading unit 106 on the digital image data obtained from the input data selector 401. The random noise component can be detected erroneously as an edge image that represents edge portions of an original image in edge detecting processing. The noise remover 402 therefore removes the noise component before edge detection. The noise remover 402 can use a general kind of moving average filter, a bilateral filter capable of removing the noise component while saving the edge image, or the like to remove noise. The noise remover 402 transmits the digital image data from which noise has been removed to the edge detector 403.

The edge detector 403 is configured to detect an edge image that represents edge portions of an original image by performing edge detecting processing on the digital image data from which noise has been removed. The main-scan counter 404 is configured to control a range in the main scanning direction (width direction) in which the edge detector 403 detects an edge, based on an edge detection range in the main scanning direction that is set by the CPU 301. The sub-scan counter 405 is configured to control a range in the sub-scanning direction (conveying direction) in which the edge detector 403 detects an edge, based on an edge detection range in the sub-scanning direction that is set by the CPU 301.

The edge detector 403 detects the edge image of the original image within the edge detection ranges set by the main-scan counter 404 and the sub-scan counter 405. The edge detector 403 stores the detected edge image and edge information, which is generated from the edge image and which is described later, in the memory 307. The edge detector 403 uses first-order differentiation, second-order differentiation, Hough transform, or other known methods to detect the edge image of the original image.

Figure 5A:
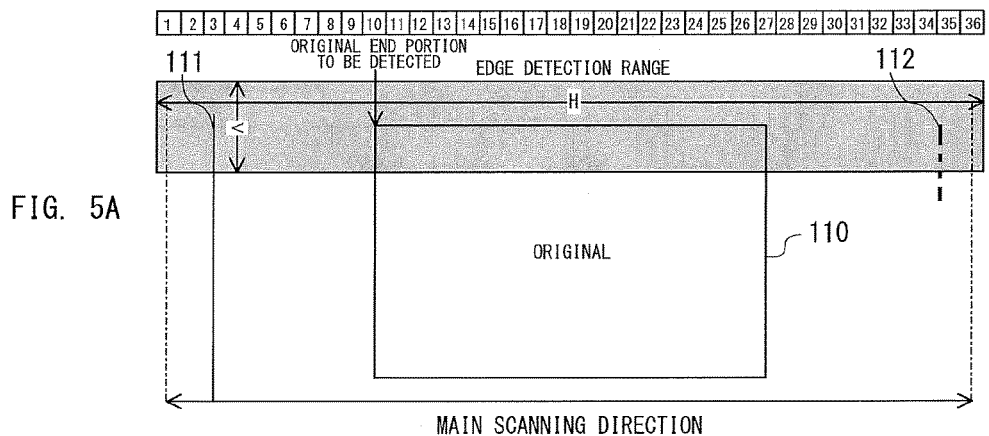
FIG. 5A, FIG. 5B, FIG. 5C, and FIG. 5D are explanatory diagrams of edge detecting processing and main scanning edge location detecting processing.

FIG. 5A to FIG. 5D are explanatory diagrams of edge detecting processing and processing of detecting a main scanning edge location, which is an edge location of the original in the main scanning direction. In FIG. 5A to FIG. 5D, the left-right direction is the main scanning direction (width direction), and the top-bottom direction is the sub-scanning direction (conveying direction). A pixel at the left end of the drawings is treated as the first pixel and a pixel at the right end of the drawings is treated as the thirty-sixth pixel for description. FIG. 5A is an explanatory diagram of the range of detection of the original image edge. In this embodiment, an edge detection range H in the main scanning direction which is set in the main-scan counter 404 measures thirty-six pixels, and an edge detection range V in the sub-scanning direction which is set in the sub-scan counter 405 measures four pixels. Setting the size of the edge detection range V to four pixels enables the edge detector 403 to detect edge portions of an original image even when the original image is slightly slanted. The edge detection range V is set to suit the state in which the original 102 is conveyed. The edge detection range V is set to a range that measures given pixels (a given plurality of lines) from a point preceding the front end of the original 102 in the original conveying direction.

Figure 5B:
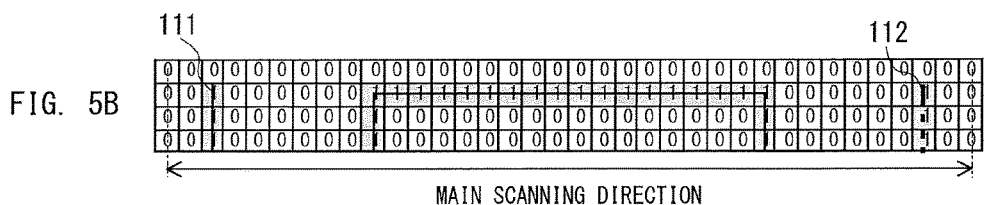

A detected image that is obtained from an original image through the edge detecting processing includes a fixed speck image 111, which is caused by fixed specks and which is indicated by the straight line in FIG. 5A and FIG. 5B, and a floating speck image 112, which is caused by floating specks and which is indicated by the broken line in FIG. 5A and FIG. 5B, in an edge image 110, which represents edge portions of the original 102.

Figure 5C:
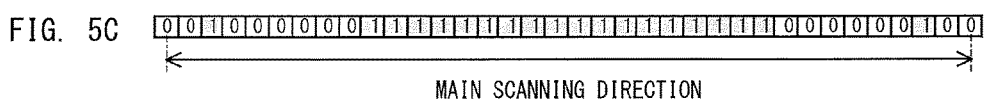

The edge detector 403 conducts edge detection within the edge detection ranges H and V to obtain a detection result of FIG. 5B. The edge detector 403 detects, for example, pixels where the color changes from the background color as an edge portion. The edge detector 403 digitizes the detection image by assigning "1" to a pixel that is detected as a part of an edge portion and "0" to a pixel that is not detected as a part of an edge portion. The fixed speck image 111 and the floating speck image 112 are detected as edge portions, and pixels in the fixed speck image 111 and the floating speck image 112 are accordingly assigned "1". Based on this detection image, the edge detector 403 performs logical addition in the sub-scanning direction for each point (each pixel) in the main scanning direction, and obtains, for each pixel in the main scanning direction, a calculation result that assigns "1" to a pixel for which the edge image is detected even once and "0" to a pixel for which an edge is detected not even once. The results of the logical addition in the sub-scanning direction are illustrated in FIG. 5C. The logical addition results indicate, for each point in the main scanning direction, whether or not the edge image is detected at the point. The edge detector 403 stores the logical addition results as edge information in the memory 307. In this embodiment, the third and thirty-fourth pixels from the right in the drawing in the main scanning direction are detected as parts of edge portions as a result of the logical addition, due to the fixed speck image 111 and the floating speck image 112. In this manner, the edge detector 403 generates from digital image data the edge information, an example of which is illustrated in FIG. 5C.

(Edge Determining Unit)

Figure 5D:
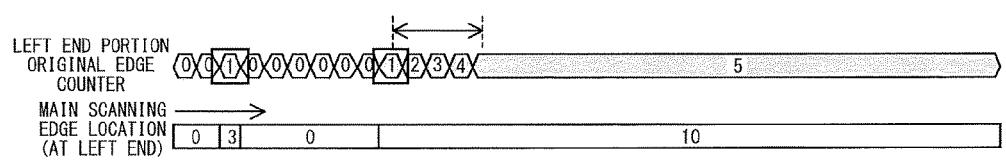
Figure 5D:
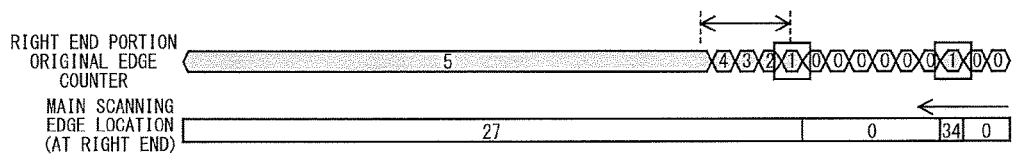

The edge determining unit 306 obtains from the memory 307 edge information generated by the edge detector 403 as the one illustrated in FIG. 5C, and executes processing of detecting the left main scanning edge location and the right main scanning edge location based on the edge information. FIG. 5D is an explanatory diagram of the left and right main scanning edge location detecting processing executed by the edge determining unit 306. The edge determining unit 306 checks the edge information one pixel by one pixel from both directions of the main scanning direction to detect two end portions of the edge image 110 in the main scanning direction. In this embodiment, by checking the edge information from both directions of the main scanning direction at the same time, the edge determining unit 306 detects the left end portion and right end portion of the edge image 110.

In the case where a given number of successive pixels are set to a value "1" in the edge information, the edge determining unit 306 determines the location of the pixel at the head of the successive pixels as a main scanning edge location. The given number for successive pixels that have a value "1" is five in this embodiment. The given number for successive pixels is set as the original edge determination value in the edge determining unit 306 by the CPU 301. The edge determining unit 306 includes a left end portion original edge counter and a right end portion original edge counter (not shown) to count how many successive pixels have a value "1". The edge determining unit 306 latches the location of a pixel that is set to a value "1" as a main scanning edge location and, when a pixel that has a value "0" is detected subsequently, clears the count of the relevant counter to "0" and clears the latched main scanning edge location as well.

In the example of FIG. 5D, where the third pixel has a value "1", the edge determining unit 306 latches the third pixel as a left main scanning edge location and sets the count of the left end portion original edge counter to "1". However, the fourth pixel has a value "0". The edge determining unit 306 accordingly clears the latched left main scanning edge location and clears the count of the left end portion original edge counter to "0".

The tenth pixel has a value "1". The edge determining unit 306 therefore latches the tenth pixel as a left main scanning edge location and sets the count of the left end portion original edge counter to "1". The following successive pixels up through the twenty-seventh pixel have a value "1". Because the original edge determination value is five in this embodiment, the edge determining unit 306 determines the pixel at the latched left main scanning edge location as the edge location of the left end portion of the original image after the value of the fourteenth pixel is checked.

The edge location of the right end portion of the original image is determined as follows. In the example of FIG. 5D, where the thirty-fourth pixel has a value "1", the edge determining unit 306 latches the thirty-fourth pixel as a right main scanning edge location and sets the count of the right end portion original edge counter to "1". However, the thirty-third pixel has a value "0". The edge determining unit 306 accordingly clears the latched right main scanning edge location and clears the count of the right end portion original edge counter to "0".

The twenty-seventh pixel has a value "1". The edge determining unit 306 therefore latches the twenty-seventh pixel as a right main scanning edge location and sets the count of the right end portion original edge counter to "1". The following successive pixels up through the tenth pixel have a value "1". Because the original edge determination value is five in this embodiment, the edge determining unit 306 determines the pixel at the latched right main scanning edge location as the edge location of the right end portion of the original image after the value of the twenty-third pixel is checked.

In the manner described above, when a given number of successive pixels that is specified by the CPU 301 are set to a value "1" in the edge information, the edge determining unit 306 determines the pixel at the head of the successive pixels as an edge portion of a read original image, not a vertical streak caused by specks. The edge determining unit 306 determines the tenth pixel as the original start point at the left end and the twenty-seventh pixel as the original start point at the right end, and transmits the result of determining the main scanning edge location at the left end and the right end to the CPU 301.

Figure 6:
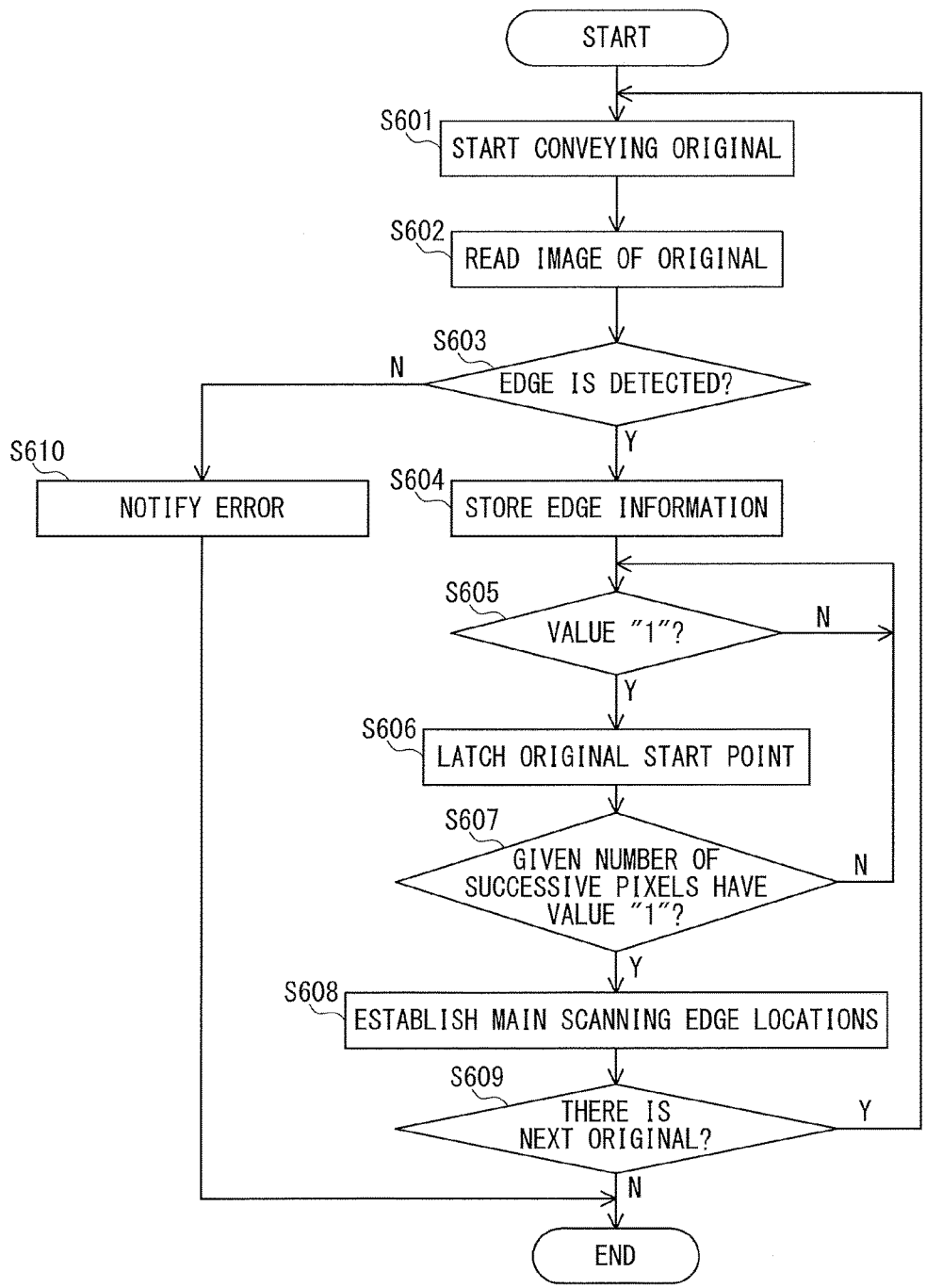
FIG. 6 is a flow chart for illustrating processing of determining a main scanning edge location.

FIG. 6 is a flow chart for illustrating the processing of determining the left main scanning edge location and right main scanning edge location of an original image. The image reading apparatus executes original image reading processing in response to an instruction to start image reading processing which is issued by the user through the operation unit 406.

The controller 300 receives the instruction to start image reading processing from the operation unit 306 and starts conveying the original 102 using the original conveying motor 105 (Step S601). The image reading unit 106 reads an original image while the original 102 is being conveyed by the sheet feeding roller 121 and the conveying roller 122 from the original tray 101 to the image reading position 107 (Step S602). The image reading unit 106 inputs analog image data that represents the read original image to the controller 300. The delivery roller 123 delivers the original 102 having the original image read from the image reading position 107 onto the delivery tray 108.

The controller 300 uses the A/D converter 303 and the shading corrector 304 to generate digital image data by converting the analog image data obtained from the image reading unit 106 into digital data and then making a shading correction to the digital data. The edge information obtaining unit 305 of the controller 300 uses the edge detector 403 to detect an edge from the image data (Step S603). In the case where an edge is successfully detected (Step S603: Y), the edge detector 403 generates the edge information, an example of which is illustrated in FIG. 5C, and stores the edge information in the memory 307 (Step S604). In the case where the edge detector 403 is unsuccessful in detecting an edge (Step S603: N), the controller 300 determines that an error has occurred in the image reading apparatus, and notifies the error through the output device of the operation unit 406 (Step S610).

The edge determining unit 306 obtains the edge information from the memory 307, and searches for the left main scanning edge location and right main scanning edge location of the original image in the manner illustrated in FIG. 5D. To find the edge locations, the edge determining unit 306 checks for a pixel that has a value "1" (Step S605). In the case where a pixel having a value "1" is checked (Step S605: Y), the edge determining unit 306 latches this pixel as an original start point (Step S606). The edge determining unit 306 checks whether or not a given number of successive pixels have a value "1" (Step S607). In the case where the given number of successive pixels have a value "1" (Step S607: Y), the edge determining unit 306 establishes the location of the pixel latched in Step S606 as a main scanning edge location (Step S608). In the case where the checked pixel does not have a value "1" (Step S605: N), or in the case where the number of successive pixels that have a value "1" does not reach the given number (Step S607: N), the edge determining unit 306 checks the value of the next pixel (Step S605). The edge determining unit 306 executes Steps S605 to S608 from the left side and right side of the main scanning direction each, to thereby establish the left main scanning edge location and the right main scanning edge location.

After the left and right main scanning edge locations of the original image are established, the controller 300 determines whether or not the next original 102 is placed on the original tray 101 (Step S609). The original tray 101 includes, for example, a sensor configured to detect the original 102 that is placed on the tray. The result of the detection of this sensor enables the controller 300 to determine whether or not the next original 102 is placed on the original tray 101. In the case where the next original 102 is placed on the tray (Step S609: Y), the controller 300 starts conveying the next original 102 using the original conveying motor 105, and repeats the image reading processing (Step S601). In the case where the next original 102 is not placed on the tray (Step S609: N), the controller 300 ends the main scanning edge location determining processing.

(Edge Detection in the Sub-scanning Direction)

An edge of an original image in the sub-scanning direction is detected by the edge detector 403 of the edge information obtaining unit 305. The following is a description on the detection of an edge image of an original image in the sub-scanning direction, namely, processing of detecting the front edge in the original conveying direction, which is executed by the edge detector 403. The front end of the original 102 in the original conveying direction has a shadow because of the positional relation between light from the LED light source 201 and the original 102 being conveyed. This shadow portion has some width in the original conveying direction. The edge image in the sub-scanning direction needs to be detected accurately from the original image in order to correct with precision the inclination of the front end of the original 102 in the original conveying direction.

Figure 7:
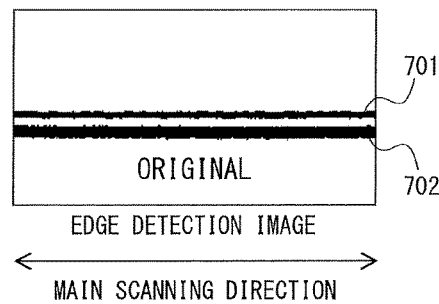
FIG. 7 is an explanatory diagram of the relation between an image of a shadow of an original and an image of the front edge of the original in an original conveying direction.

FIG. 7 is an explanatory diagram of the relation between an image of a shadow of the original 102 and an image of the front edge of the original 102 in the original conveying direction. As illustrated in FIG. 7, the edge detector 403 detects an edge portion caused by the shadow as a shadow portion edge image 701, and detects a portion where a shift from the shadow portion to the original portion takes place as an original portion edge image 702. The edge detector 403 thus detects an edge in duplicate as the shadow portion edge image 701 and the original portion edge image 702. This is because, when the shadow is wide, although the local detection area (filter size) for edge detection is also an influencing factor, the shadow portion tends to have a steady luminance and it is consequently determined that there is no edge shift within the local detection area (filter size).

In order to detect the edge image from the original image accurately, the edge detector 403 checks the edge detection result of FIG. 5B in the sub-scanning direction, and detects a location (pixels) where an edge shift (a shift in value from "0" to "1") occurs for the second time as the original portion edge image 702. In some cases, there is no shadow portion edge image 701 to detect. A singular edge image appears in such cases. The edge detector 403 latches the location (pixels) of an edge shift (a shift from "0" to "1") that occurs for the first time, and checks whether or not there is an edge shift within an area between the latched location and a location that is at a distance of a given number of pixels from the latched location in the sub-scanning direction. When there is no edge shift, the edge detector 403 detects the latched location as the original portion edge image 702. The original portion edge image 702 in this case indicates the location of an edge of the original image in the sub-scanning direction (a sub-scanning edge location).

Figure 8:
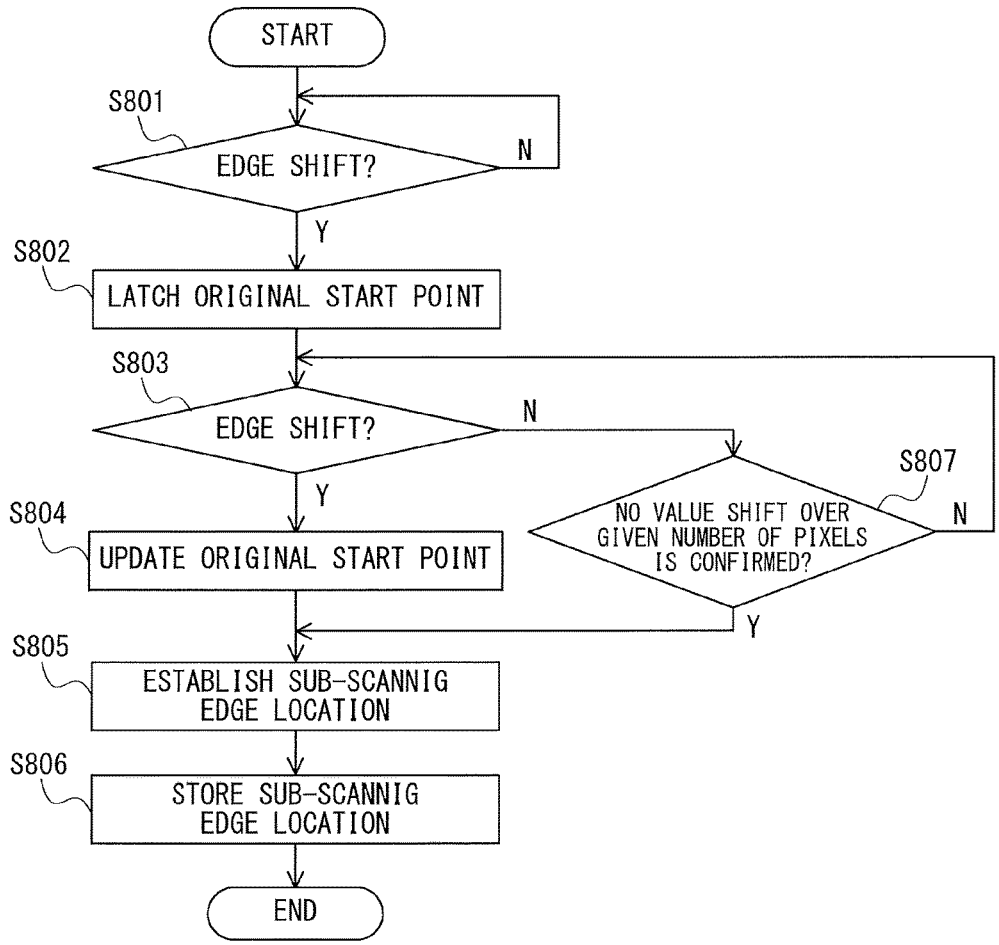
FIG. 8 is a flow chart for illustrating processing of detecting a sub-scanning edge location.

FIG. 8 is a flow chart for illustrating the processing of detecting this sub-scanning edge location. The processing of FIG. 8 is executed in Step S603 of the processing of determining the main scanning edge locations illustrated in FIG. 6, using the edge detection result of FIG. 5B which is generated by the edge detector 403 from digital image data through edge detection.

The edge detector 403 checks the value of each pixel in the edge detection result in the sub-scanning direction (Step S801). In the case where there is a shift in value (a shift from "0" to "1") (Step S801: Y), the edge detector 403 latches a pixel where the shift in value takes place as an original start point in the sub-scanning direction (Step S802). The edge detector 403 continues to check the value of each pixel in the edge detection result in the sub-scanning direction (Step S803). In the case where there is a shift in value (a shift from "0" to "1") (Step S803: Y), the edge detector 403 updates the pixel latched as an original start point in the sub-scanning direction in Step S802 with a pixel where the shift in value takes place this time (step S804). In the case where there is no shift in value (Step S803: N), the edge detector 403 keeps checking the pixel value until it is confirmed that there is no shift in value over a given number of pixels in the sub-scanning direction (Step S807: N, Step S803).

After the original start point in the sub-scanning direction is updated, or when it is confirmed that there is no shift in value over a given number of pixels in the sub-scanning direction (Step S807: Y), the edge detector 403 detects the location of the latched pixel as the sub-scanning edge location of the original image (Step S805). The edge detector 403 stores the detected sub-scanning edge location in the memory 307 (Step S806). The sub-scanning edge location of an original image is detected through the processing described above.

(Tilt Expression Calculator)

Linear expression calculating processing executed by the tilt expression calculator 308 is described. The tilt expression calculator 308 determines an effective data range of the edge detection result to be used in the calculation of a linear expression, based on the main scanning edge locations at the left end and the right end that are determined by the edge determining unit 306, and on the sub-scanning edge location detected by the edge detector 403. The tilt expression calculator 308 calculates a linear expression that represents the amount of inclination of an original image with respect to the main scanning direction within the effective data range. The calculation of the linear expression uses, for example, a general least square method or Hough transform. End portions of the original 102, corner portions, in particular, may be deteriorated from being torn or dog-eared, or through natural process. The tilt expression calculator 308 therefore uses the edge detection result that is within the effective data range in the calculation of the linear expression. From the left and right main scanning edge locations determined by the edge determining unit 306, the tilt expression calculator 308 calculates an original image center point ((left main scanning edge location)+(right main scanning edge location)/2) and an original image length ((right main scanning edge location)−(left main scanning edge location)). The tilt expression calculator 308 obtains from the edge detection result the values of a given number of pixels in the main scanning direction with the original image center point as the midpoint, within the range of the original image length (between the right main scanning edge location and the left main scanning edge location). The given number of pixels in the main scanning direction with the original image point as the midpoint are regarded as the effective data range.

Figure 9:
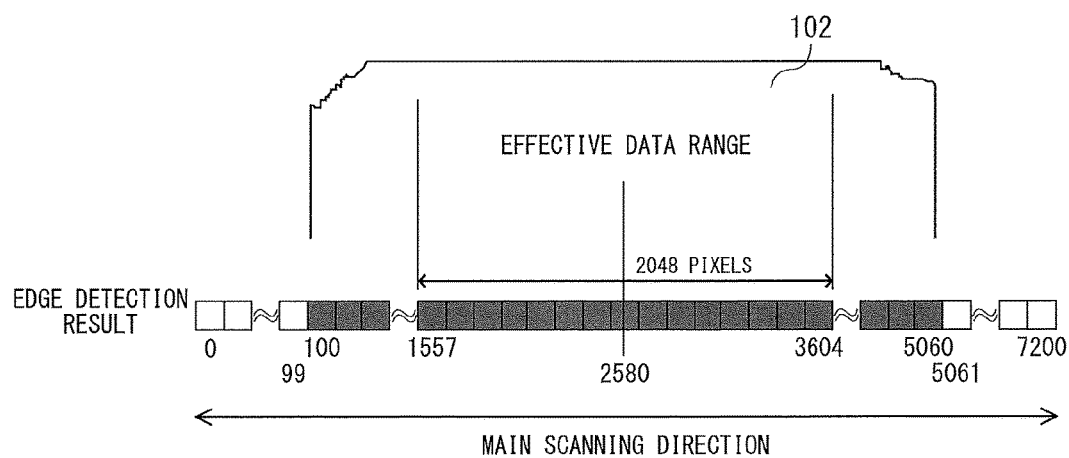
FIG. 9 is an explanatory diagram of an effective data range.

FIG. 9 is an explanatory diagram of the effective data range. The original image here has in the main scanning direction 7,200 pixels, of which the first pixel is the leftmost pixel in the drawing and the 7,200th pixel is the rightmost pixel in the drawing. The edge determining unit 306 determines the location of the hundredth pixel as the left main scanning edge location, and the location of the 5,060th pixel as the right main scanning edge location. In this case, the original image center point is at the 2,580th pixel and the original image length is 4,960 pixels long. The effective data range in FIG. 9 is a range of 2,048 pixels (from the 1,557th pixel to the 3,604th pixel) in the main scanning direction with the original image center point as the midpoint. The tilt expression calculator 308 calculates a linear expression that is in the (y=ax+b) form based on the sub-scanning edge location within the effective data range. Specifically, the inclination amount (a), the tilt direction (0 or 1), the intercept (b), and the intercept direction (0 or 1) are calculated by assigning "0" for plus and "1" for minus with respect to the plus/minus signs of the inclination amount and the direction of the slope of the intercept. The original image length calculated by this processing may be output to the CPU 301 to be used for establishing the main scanning size of the read original.

(Reference Point Calculator)

Reference point calculating processing executed by the reference point calculator 309 is described. An example described here is one in which the left-end corner point of an end portion of an original image in the sub-scanning direction is calculated as a reference point. The reference point calculator 309 calculates one of the left-end corner point and the right-end corner point in response to an instruction from the CPU 301.

When end portions of the original 102 are deteriorated, the corner point of the original image cannot be determined accurately from the edge detection result, and the corner point needs to be deduced. The left main scanning edge location determined by the edge determining unit 306, the sub-scanning edge location detected by the edge detector 403, and the linear expression calculated by the tilt expression calculator 308 are used to deduce the accurate corner point.

Figure 10:
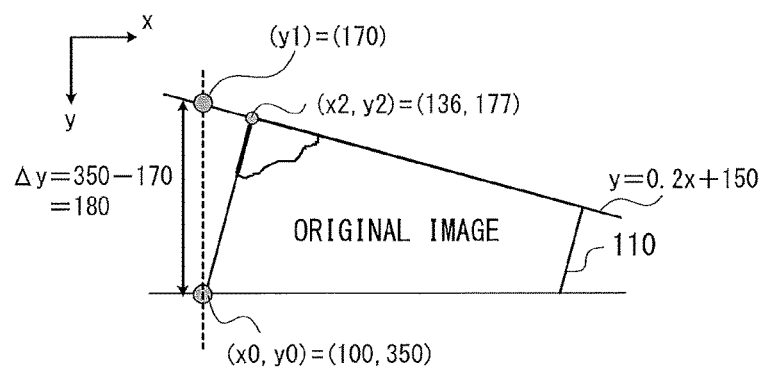
FIG. 10 is an explanatory diagram of reference point calculating processing.

FIG. 10 is an explanatory diagram of the reference point calculating processing. In FIG. 10, a left main scanning edge location x0 is "100", a location y0 in the sub-scanning direction of the edge image 110 at the left main scanning edge location is "350", the linear expression is y=0.2x+150, and a reference point calculated from the edge locations by the linear expression is (x2, y2). A straight line along the sub-scanning direction that runs through the left main scanning edge location intersects with the linear expression in this case, and a location y1 of the intersecting point (a virtual reference point) in the sub-scanning direction is calculated as y1=0.2×100+150=170. A difference Δy in the sub-scanning direction between the left main scanning edge location x0 and the location y1 is calculated as Δy=350−170=180. The product of the difference Δy and the inclination amount a, specifically, 36, is the number of pixels by which an adjustment is made in the main scanning direction. The calculation of the amount of adjustment in the main scanning direction which is a complicate and exact calculation in the related art is thus simplified in this embodiment. With this calculation method, the precision of the adjustment amount drops as the tilt of the original image grows larger. However, the CPU 301 exerts control so that an adjustment by less than one pixel (for example, less than 42 μm at 600 dpi) can be made when the tilt is within a range that can be corrected by the inclination corrector 310.

The reference point calculator 309 calculates the reference point by adjusting the virtual reference point by the calculated adjustment amount. The reference point calculator 309 determines whether to make an adjustment in a plus direction (0) or a minus direction (1) with respect to the left main scanning edge location by the calculated adjustment amount in the main scanning direction. In the case where the slope of the linear expression calculated by the tilt expression calculator 308 is in the plus (0) direction, the original image is tilted to the lower right and is corrected in the plus direction with respect to the left main scanning edge location. In the case where the slope of the linear expression calculated by the tilt expression calculator 308 is in the minus (1) direction, the original image is tilted to the upper right and is corrected in the minus direction with respect to the left main scanning edge location.

For example, when the original image is tilted to the lower right (the tilt direction: plus (0)) as in FIG. 10, the left main scanning edge location x0 is at the hundredth pixel, and the adjustment amount is thirty-six pixels, the reference point calculator 309 determines that an adjustment is to be made in the plus (0) direction. The reference point calculator 309 also deduces the 136th pixel (100+36=136) as a deduced main scanning edge location x2 at the left end of the original image. A deduced sub-scanning edge location y2 is calculated by substituting the deduced main scanning edge location x2 at the left end that has been adjusted into the linear expression. In the example of FIG. 10, the deduced sub-scanning edge location at the left end is calculated as y2=0.2×136+150=177 by substituting the deduced main scanning edge location x2 at the left end into the linear expression. While a number with a fractional part is rounded off to the closest whole number in this example, the fractional part may be dropped instead. Through the described processing steps, the reference point calculator 309 deduces the reference point (x2, y2) for inclination correction which is used by the inclination corrector 310 to correct the inclination.

Figure 11:
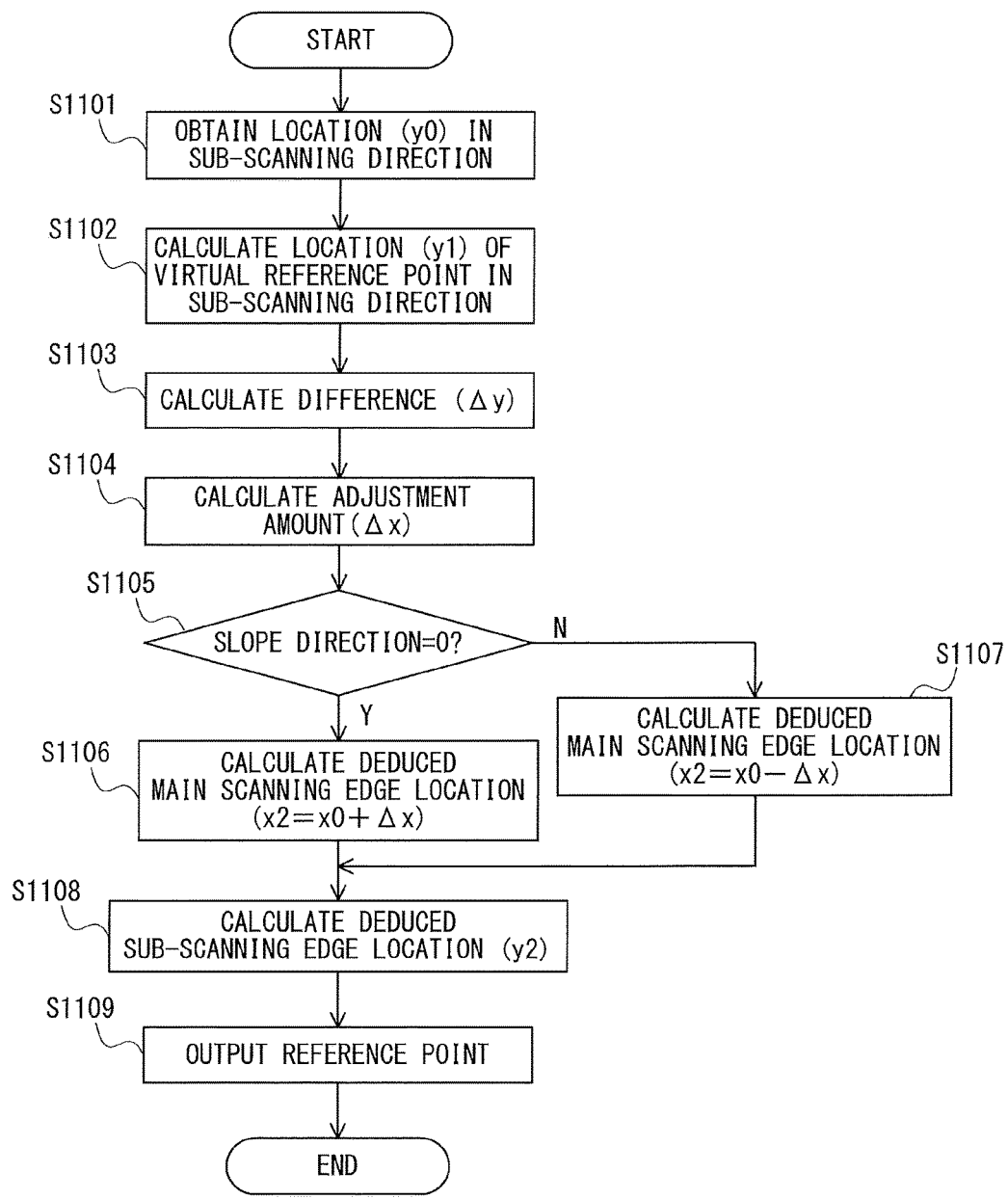
FIG. 11 is a flow chart for illustrating the reference point calculating processing.

FIG. 11 is a flow chart for illustrating processing that is executed by the reference point calculator 309 to calculate the reference point for inclination correction. The reference point calculator 309 executes this processing in response to an instruction from the CPU 301. The following description deals with a case of deducing the left-end corner point as the reference point. However, the same processing is executed in the case where the right-end corner point is deduced as the reference point.

The reference point calculator 309 obtains the location y0 in the sub-scanning direction which is associated with the left main scanning edge location x0 determined by the edge determining unit 306 (Step S1101). The reference point calculator 309 substitutes the left main scanning edge location x0 determined by the edge determining unit 306 into the linear expression calculated by the tilt expression calculator 308 to calculate the location y1 of the virtual reference point in the sub-scanning direction (Step S1102). The reference point calculator 309 calculates the difference Δy by subtracting the sub-scanning location y0 at the left main scanning edge location from the location y1 of the virtual reference point in the sub-scanning direction (Step S1103). The reference point calculator 309 multiplies the difference Δy by the inclination amount a of the linear expression calculated by the tilt expression calculator 308 to calculate an adjustment amount Ax (Step S1104).

The reference point calculator 309 checks the direction of the slope of the linear expression calculated by the tilt expression calculator 308 (Step S1105). In the case where the slope is in the plus (0) direction (Step S1105: Y), the reference point calculator 309 calculates the deduced main scanning edge location x2 by adding the adjustment amount Ax to the left main scanning edge location x0 (Step S1106). In the case where the slope is in the minus (1) direction (Step S1105: N), the reference point calculator 309 calculates the deduced main scanning edge location x2 by subtracting the adjustment amount Δx from the left main scanning edge location x0 (Step S1107).

The reference point calculator 309 substitutes the deduced main scanning edge location x2 calculated into the linear expression calculated by the tilt expression calculator 308 to calculate the deduced sub-scanning edge location y2, which serves as a reference point for inclination correction (Step S1108). The reference point calculator 309 outputs as the reference point for inclination correction the deduced main scanning edge location x2 and the deduced sub-scanning edge location y2 that have been calculated (Step S1109). A reference point for inclination correction is calculated through the processing described above.

(Inclination Corrector)

The inclination corrector 310 corrects the inclination and position of an original image based on an inclination amount and a tilt direction that are included in the linear expression calculated by the tilt expression calculator 308, and on the reference point deduced by the reference point calculator 309. The inclination corrector 310 uses, for example, a general method of affine transform to correct the inclination.

Figure 12:
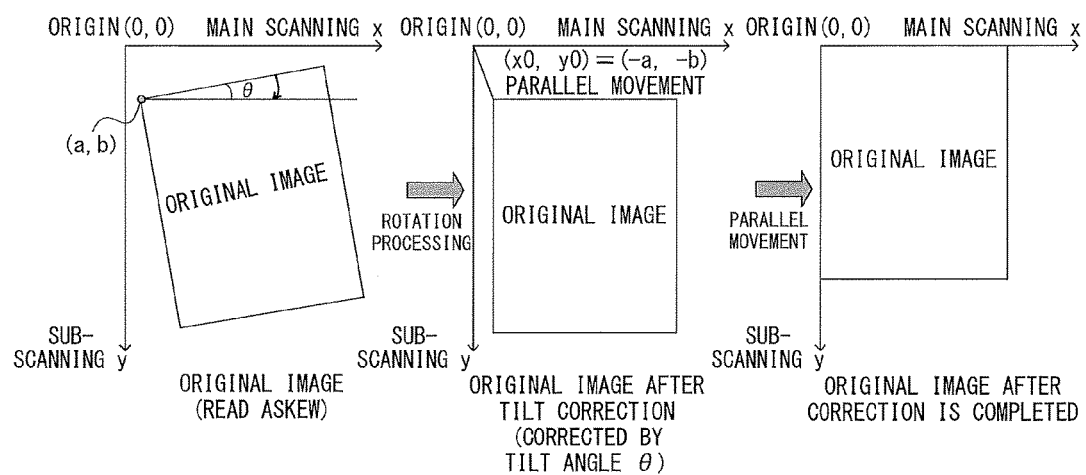
FIG. 12 is an explanatory diagram of a series of processing steps that uses affine transform.

The inclination corrector 310 uses an affine transform expression given below to calculate the location ((X) in the main scanning direction, (Y) in the sub-scanning direction) of each pixel in an original image corrected by an angle θ, which is determined in relation to the inclination amount. The inclination corrector 310 performs affine transform on digital image data stored in the memory 307, to thereby generate image data that represents an original image corrected in inclination, and outputs this image data. The reference point (x2, y2) indicates a movement amount by which the digital image data corrected in inclination is moved in parallel. Moving the corrected image data by the movement amount enables the front end of the original image to be aligned with an end portion output location. The series of processing steps that uses affine transform is illustrated in FIG. 12. The inclination corrector 310 corrects the inclination by rotation processing and parallel movement in which the original image is rotated and moved in parallel.

$$X = x \cos\theta - y \sin\theta + x2$$

$$Y = x \sin\theta + y \cos\theta + y2$$

X: the post-correction pixel location in the main scanning direction, Y: the post-correction pixel location in the sub-scanning direction x: the pre-correction pixel location in the main scanning direction, y: the pre-correction pixel location in the sub-scanning direction x2: a parallel movement amount in the main scanning direction (a reference point in the main scanning direction)

y2: a parallel movement amount in the sub-scanning direction (a reference point in the sub-scanning direction)

θ: an angle based on a tilt that is calculated from the front end of the original The image reading apparatus of this embodiment thus corrects the inclination by calculating the amount of inclination within a range that excludes deteriorated portions of edges of an original image in the main scanning direction. This enables the image reading apparatus to precisely correct the inclination of an original image using digital image data by removing the adverse effect of speck images, which are caused by fixed specks and floating specks, and the deterioration of edge portions of the original 102.

Second Embodiment

Figure 13:
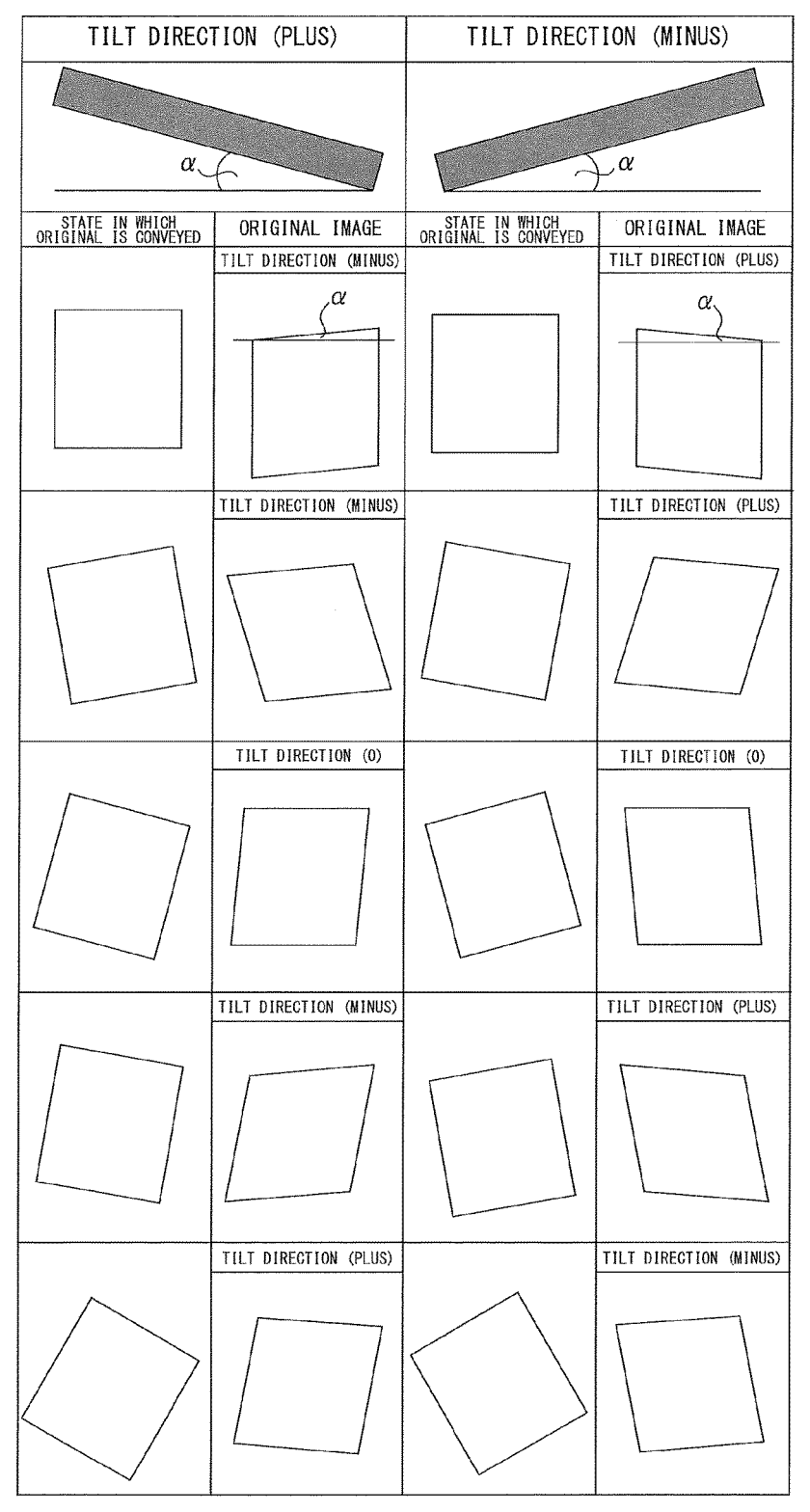

An image reading apparatus of a second embodiment of the present invention has the same hardware configuration as that of the image reading apparatus of the first embodiment which is illustrated in FIG. 1, and a description on the hardware configuration is therefore omitted. The image reading apparatus may fail to deduce the reference point accurately when the original conveying mechanism is tilted significantly with respect to a direction in which the original 102 is conveyed due to a lack of proper adjustment to the way the original conveying mechanism is attached. FIG. 13 is a diagram for illustrating the association between a state in which the original 102 is conveyed and a read original image in the case where a proper adjustment has not been made to the way the original conveying mechanism and the image reading unit 106 are attached.

An original image is basically read as a parallelogram. The reference point calculator 309 therefore cannot calculate the adjustment amount of a main scanning edge location and cannot determine the direction (plus or minus) of the slope of the linear expression from information about the tilt direction (plus: "0", minus: "1") of the original image alone. The image reading apparatus of the second embodiment obtains the amount of inclination of the original conveying mechanism through processing described below in order to calculate the adjustment amount and determine the direction of the slope.

Figure 14:
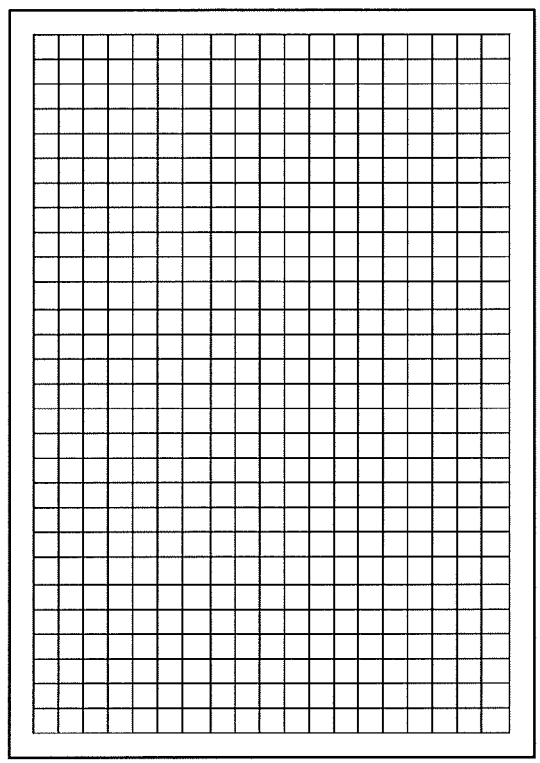
FIG. 14 is a diagram for illustrating an example of a test original.

The image reading apparatus of the second embodiment is configured so that the function of correcting the inclination can be disabled by external operation. With the inclination correcting function disabled, the image reading apparatus calculates the amount of inclination that is caused by the way the original conveying mechanism and the image reading unit 106 are attached. To accomplish this, the image reading apparatus reads a test original for inclination amount calculation which is illustrated in FIG. 14 with the inclination correcting function disabled. Longitudinal and lateral straight lines parallel to the four sides of the test original are printed on the test original. The image reading apparatus reads the test original, and calculates an inclination amount difference between lines of the read original image. A person who makes an adjustment to the image reading apparatus (an adjuster) determines the direction of an attachment tilt of the original conveying mechanism and the image reading unit 106, based on the original image patterns illustrated in FIG. 13. The calculated difference corresponds to the amount of inclination of the original conveying unit and the image reading unit 106.

Figure 15:
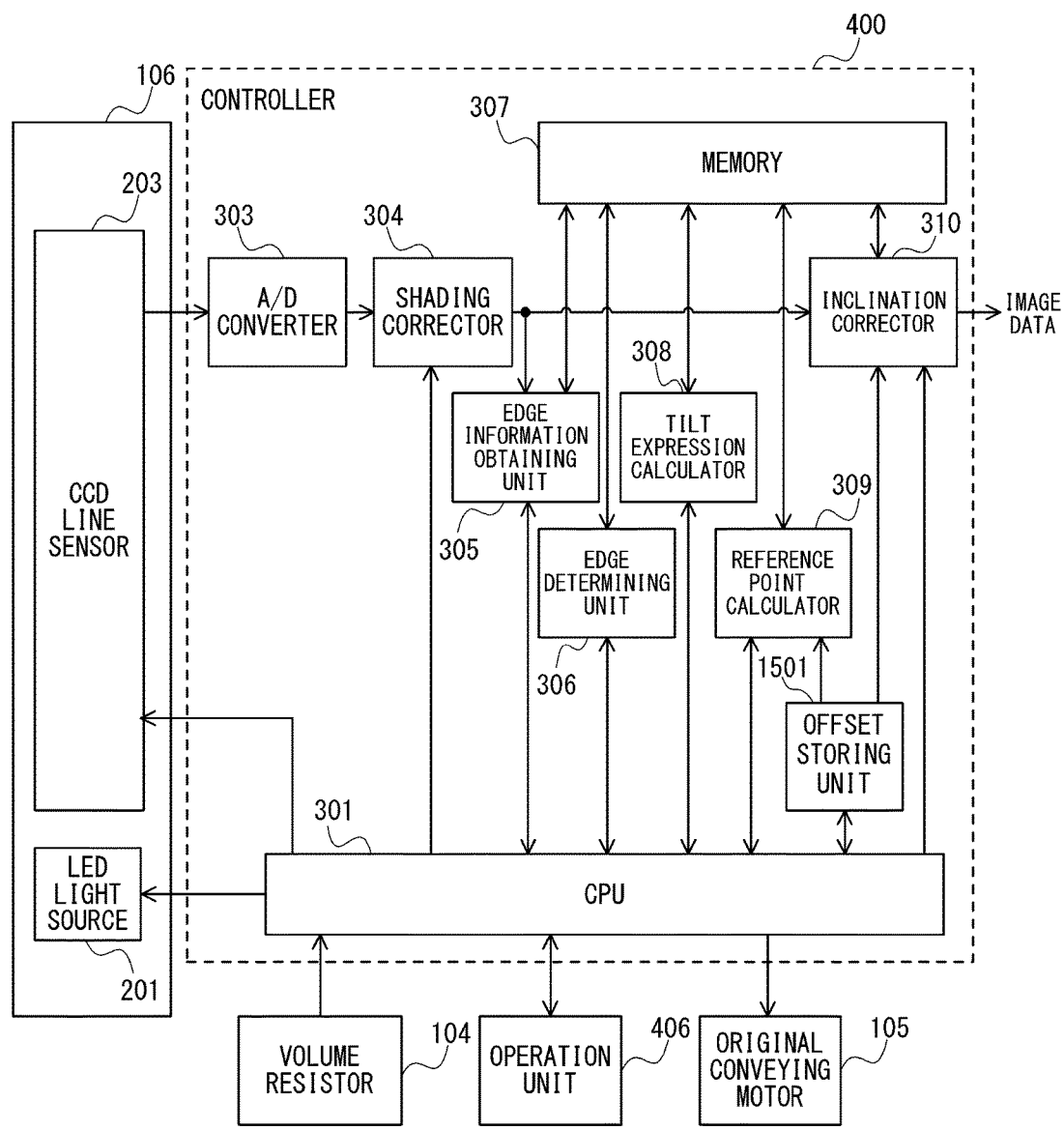
FIG. 15 is a block diagram for illustrating the configuration of a controller.

FIG. 15 is a block diagram for illustrating the configuration of a controller 400 according to the second embodiment. The controller 400 includes an offset storing unit 1501 in addition to the components of the controller 300 of the first embodiment. The offset storing unit 1501 is configured to store the amount of inclination caused by the original conveying unit and the image reading unit 106, and the direction of the inclination. The information stored in the offset storing unit 1501 is used when the inclination correcting function is enabled. The offset storing unit 1501 stores the result of measurement conducted before the image reading apparatus is put into use.

Alternatively, the adjuster sets the image reading apparatus to an adjustment mode through the operation unit 406 so that a copy of the test original of FIG. 14 is output. Setting the image reading apparatus to the adjustment mode disables the inclination correcting function. The adjuster determines the amount and direction of the inclination of the original conveying mechanism and the image reading unit 106 from the result of outputting the copy, and inputs the result of the determination through the operation unit 406. The input determination result is stored in the offset storing unit 1501 by the CPU 301.

Figure 16:
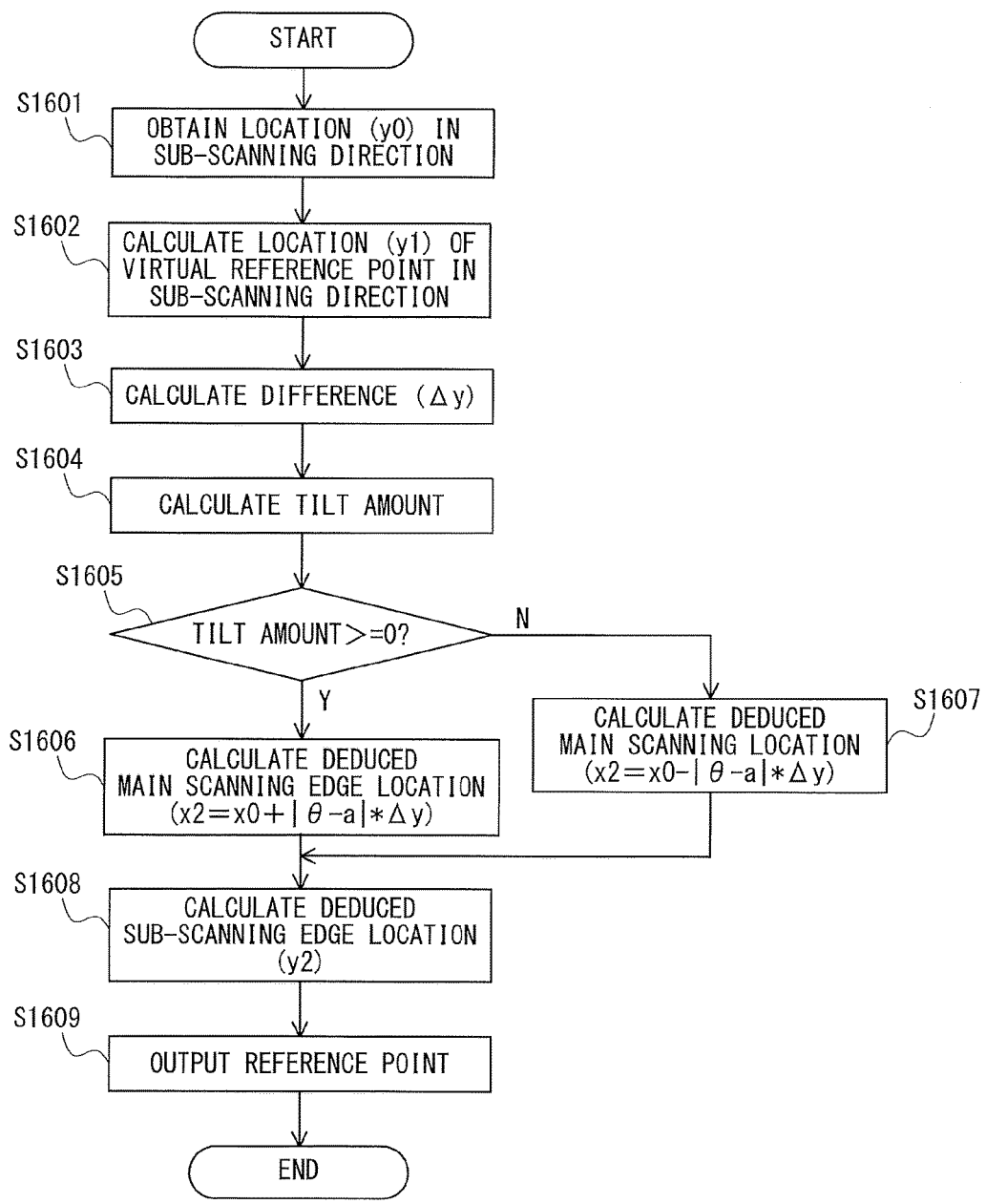
FIG. 16 is a flow chart for illustrating the reference point calculating processing.

FIG. 16 is a flow chart for illustrating the processing of calculating a reference point for inclination correction according to the second embodiment. The reference point calculator 309 executes this processing in response to an instruction from the CPU 301. The following description deals with a case of deducing the left-end corner point as the reference point. However, the same processing is executed in the case where the right-end corner point is deduced as the reference point.

The reference point calculator 309 obtains the location y0 in the sub-scanning direction which is associated with the left main scanning edge location x0 determined by the edge determining unit 306 (Step S1601). The reference point calculator 309 substitutes the left main scanning edge location x0 determined by the edge determining unit 306 into the linear expression calculated by the tilt expression calculator 308 to calculate the location y1 of the virtual reference point in the sub-scanning direction (Step S1602). The reference point calculator 309 calculates the difference $\Delta y$ by subtracting the sub-scanning location y0 at the left main scanning edge location from the location y1 of the virtual reference point in the sub-scanning direction (Step S1603).

The reference point calculator 309 obtains from the offset storing unit 1501 an inclination amount a and the direction ("0" or "1") of the inclination, and executes processing of adding the obtained inclination amount and direction to an inclination amount $\theta$, which is calculated by the tilt expression calculator 308, and the direction ("0" or "1") of the inclination (Step S1604). The result of the addition is a tilt amount skew. The tilt amount skew is expressed by, for example, $\alpha - \theta$.

The reference point calculator 309 determines whether or not the calculated tilt amount skew is equal to or more than 0 (Step S1605). In the case where the tilt amount skew is equal to or more than 0 (Step S1605: Y), the reference point calculator 309 calculates the deduced main scanning edge location x2 by adding to the left main scanning edge location x0 the product of |inclination amount $\theta$−inclination amount $\alpha$| and the difference $\Delta y$ (Step S1606). In the case where the tilt amount skew is less than 0 (Step S1605: N), the reference point calculator 309 calculates the deduced main scanning edge location x2 by subtracting from the left main scanning edge location x0 the product of |inclination amount $\theta$−inclination amount $\alpha$| and the difference $\Delta y$ (Step S1607).

The reference point calculator 309 substitutes the deduced main scanning edge location x2 calculated into the linear expression calculated by the tilt expression calculator 308 to calculate the deduced sub-scanning edge location y2, which serves as a reference point for inclination correction (Step S1608). The reference point calculator 309 outputs as the reference point for inclination correction the deduced main scanning edge location x2 and the deduced sub-scanning edge location y2 that have been calculated (Step S1609). A reference point for inclination correction is calculated through the processing described above.

The inclination corrector 310 obtains from the offset storing unit 1501 the inclination amount a and the direction ("0" or "1") of the inclination in response to an instruction issued by the CPU 301, and corrects the inclination and position of the original image based on an inclination amount that is included in the linear expression calculated by the tilt expression calculator 308. The inclination corrector 310 uses, for example, a general method of affine transform to correct the inclination.

The inclination corrector 310 uses an affine transform expression given below to calculate the location ((X) in the main scanning direction, (Y) in the sub-scanning direction) of a pixel corrected by an angle θ, which is determined in relation to the inclination amount. The inclination corrector 310 performs affine transform on digital image data stored in the memory 307, to thereby generate image data that is corrected in inclination, and outputs the corrected image data. A sign in front of the inclination amount (α) is plus when the direction of the attachment tilt is "0", and is minus when the direction of the attachment tilt is "1".

$$X = x \cos θ - y \sin θ + x2$$

$$Y = x \sin(θ±α) + y \cos(θ±α) + y2$$

X: the post-correction pixel location in the main scanning direction, Y: the post-correction pixel location in the sub-scanning direction
x: the pre-correction pixel location in the main scanning direction, y: the pre-correction pixel location in the sub-scanning direction
x2: a parallel movement amount in the main scanning direction (a main scanning rotation reference point)
y2: a parallel movement amount in the sub-scanning direction (a sub-scanning rotation reference point)
θ: an angle based on a tilt that is calculated from the front end of the original
α: the amount of attachment inclination Having the configuration described above, the image reading apparatus is capable of correcting the inclination of an original image that is caused by the way the original conveying mechanism and the image reading unit 106 are attached, in addition to providing the effects of the image reading apparatus of the first embodiment. The image reading apparatus of the second embodiment can therefore correct the inclination of an original image precisely using digital image data.

The thus described image reading apparatus of the present invention is capable of recognizing edge portions of an image of an original precisely without being influenced by the varying state of the four sides of the original. The image reading apparatus of the present invention can therefore correct the inclination and position of the original image with precision.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-216643, filed Nov. 4, 2015 which is hereby incorporated by reference herein in its entirety.

What is claimed is:

1. An image reading apparatus, comprising:
a feeder configured to convey an original on a tray;
an image sensor configured to read an image of the original and to output image data;
an edge detector configured to determine edge locations at one end and the other end of the original in a main scanning direction perpendicular to a conveying direction of the original, based on the image data;
a tilt expression calculator
configured to determine a first area that comprises a midpoint between the edge locations at the one end and the other end, based on the edge locations, the first area being narrower than a second area between the one end and the other end, and
configured to calculate a linear expression that represents an amount of inclination of the original image within the first area with respect to the main scanning direction, based on a leading edge position of the original within the first area;
a reference point calculator configured to calculate a reference point that is a reference for inclination correction, by using the linear expression and the edge location at the one end; and
an inclination corrector configured to correct the inclination of the image data based on the reference point and the linear expression.

2. The image reading apparatus according to claim 1, wherein the reference point calculator is configured to calculate the reference point by calculating a virtual reference point from one of the edge locations by the linear expression, multiplying a difference between the virtual reference point and the one of the edge locations by the inclination amount to calculate an adjustment amount, and adjusting the virtual reference point by the calculated adjustment amount.

3. The image reading apparatus according to claim 1, wherein the inclination corrector is configured to correct the inclination by rotation processing and parallel movement in which the original image is rotated and moved in parallel.

4. The image reading apparatus according to claim 1, further comprising an edge information obtaining unit configured to detect an image of the edge portions of the original image along a plurality of lines in the main scanning direction of the image read by the image reading unit, and to obtain, for each point in the main scanning direction, edge information that indicates whether or not an image of an edge portion in the sub-scanning direction is detected at the each point,
wherein the edge detector is configured to obtain the edge location at the one end based on a point where, through detection based on the edge information and conducted from a one direction of the main scanning direction, a given number of successive edge portion images are detected, and to obtain the edge location at the other end based on a point where, through detection based on the edge information and conducted from the other direction, which is opposite to the one direction, of the main scanning direction, the given number of successive edge portion images are detected.

5. The image reading apparatus according to claim 1, wherein the linear expression includes a parameter indicating slope and a parameter indicating intercept with respect to pixel position within the first area.

6. An image reading method, which is executed by an image reading apparatus comprising an image sensor, a tray, a feeder configured to convey an original on the tray, and a controller, the image sensor being configured to read an image of the original and output image data, the image reading method, which is executed by the controller, comprising:
detecting edge locations at one end and the other end of the original image in a main scanning direction perpendicular to a conveying direction of an original, based on the image data;
determining a first area that comprises a midpoint between the edge locations at the one end and the other end, based on the edge locations, the first area being narrower than a second area between the one end and the other end;

calculating a linear expression that represents an amount of inclination of the original image within the first area with respect to the main scanning direction, based on a leading edge position of the original within the first area;

calculating a reference point that is a reference for inclination correction, by using the linear expression and the edge location at the one end; and correcting the inclination of the image data based on the reference point and the linear expression.

7. The image reading method according to claim 6, further comprising calculating, by the controller, the reference point by calculating a virtual reference point from one of the edge locations by the linear expression, multiplying a difference between the virtual reference point and the one of the edge locations by the inclination amount to calculate an adjustment amount, and adjusting the virtual reference point by the calculated adjustment amount.

8. The image reading method according to claim 6, further comprising correcting, by the controller, the inclination by rotation processing and parallel movement in which the original image is rotated and moved in parallel.

9. The image reading method according to claim 6, further comprising:

obtaining, by the controller, for each point in the main scanning direction, edge information that indicates whether or not an image of an edge portion in the sub-scanning direction is detected at the each point, based on an image of the edge portions of the original image that are detected along a plurality of lines in the main scanning direction of the image read by the image reading unit; and obtaining, by the controller, the edge location at the one end based on a point where, through detection based on the edge information and conducted from a one direction of the main scanning direction, a given number of successive edge portion images are detected, and obtaining the edge location at the other end based on a point where, through detection based on the edge information and conducted from the other direction, which is opposite to the one direction, of the main scanning direction, the given number of successive edge portion images are detected.

* * * * *